United States Patent
Fasciati

[11] 3,932,378
[45] Jan. 13, 1976

[54] SULFONATED DISAZO DYESTUFFS CONTAINING AN ETHER GROUP

[75] Inventor: Alfred Fasciati, Bottmingen, Switzerland

[73] Assignee: Ciba-Geigy AG, Basel, Switzerland

[22] Filed: Aug. 18, 1971

[21] Appl. No.: 172,877

[30] Foreign Application Priority Data
Aug. 25, 1970  Switzerland.................. 12647/70
Aug. 11, 1971  Switzerland.................. 11798/71

[52] U.S. Cl..................... 260/174; 8/13; 8/41 B; 8/41 R; 260/152; 260/191; 260/186
[51] Int. Cl.²....................................... C07C 107/06
[58] Field of Search........... 260/174, 186, 191, 184, 260/177

[56] References Cited
UNITED STATES PATENTS

| | | | |
|---|---|---|---|
| 1,711,390 | 4/1929 | Knecht................ | 260/191 |
| 3,060,168 | 10/1962 | Liechti................ | 260/191 |
| 3,485,814 | 12/1969 | Speck.................. | 260/186 |
| 3,708,596 | 1/1973 | Happe et al. ........ | 260/191 |
| 3,725,384 | 4/1973 | Zickendraht et al. .... | 260/184 |

FOREIGN PATENTS OR APPLICATIONS

| | | | |
|---|---|---|---|
| 882,533 | 11/1961 | United Kingdom...... | 260/186 |
| 1,201,549 | 12/1959 | France................ | 260/186 |
| 617,666 | 8/1935 | Germany............... | 260/191 |
| 396,260 | 8/1963 | Switzerland.......... | 260/174 |

*Primary Examiner*—John D. Randolph
*Assistant Examiner*—Robert W. Ramsuer
*Attorney, Agent, or Firm*—Joseph G. Kolodny; Edward McC. Roberts; Prabodh I. Almaula

[57] ABSTRACT

Disazo compounds of the formula

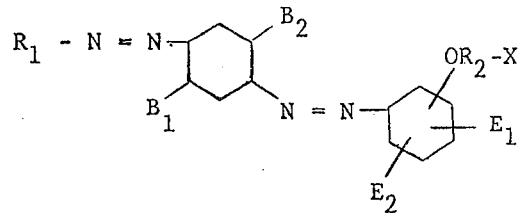

in which $R_1$ represents a sulphobenzene or sulphonaphthalene radical, $B_1$, $B_2$, $E_1$ and $E_2$ each represents a hydrogen atom, a low molecular alkyl or alkoxy radical, $R_2$ represents a low molecular alkylene radical, X represents a functional radical, and $-OR_2-X$ is in the ortho- or para-position to the azo bridge, and process for the preparation of these dyestuffs. These dyestuffs provide natural and synthetic polyamides, e.g. wool and nylon, with dyeings of excellent general fastness properties.

10 Claims, No Drawings

SULFONATED DISAZO DYESTUFFS CONTAINING AN ETHER GROUP

The present invention relates to new disazo compounds which correspond to the general formula

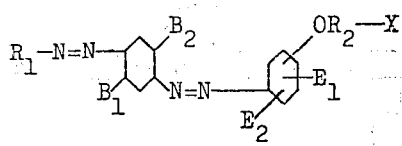

in which $R_1$ represents a sulphobenzene or sulphonaphthalene radical, $B_1$, $B_2$, $E_1$ and $E_2$ each represent a hydrogen atom, a low molecular alkyl or alkoxy radical, $R_2$ represents a low molecular alkylene radical, X represents a functional radical such, for example, as a halogen atom, a cyano, hydroxy, alkoxy, aryloxy, carboxy, alkoxycarbonal, acyl or acyloxy group, and $-OR_2-X$ is in the ortho- or para-position to the azo bridge. In these compounds, $R_1$ is advantageously a radical

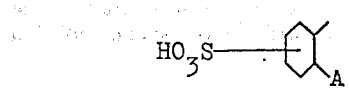

in which A represents a hydrogen or chlorine atom, a low molecular alkyl or alkoxy radical.

Particular interest attaches to disazo compounds of the formula (1) which contain in the molecule several, preferably altogether two to four, lower molecular alkyl or alkoxy groups. These groups are bonded in particular as substituents $B_1$ and $B_2$ to the intermediate component. By low molecular alkyl or alkoxy radicals are to be understood those which contain at most 4 carbon atoms, for example the n-butyl, n-propyl, isopropyl, ethyl and methyl groups, the corresponding butoxy and propoxy groups and above all, ethoxy and methoxy groups. The substituents $E_1$ and $E_2$ are preferably hydrogen atoms. The alkylene radical $R_2$ may be straight-chain or branched. As examples there may be mentioned: the methylene, ethylene, n-propylene, 2-methylpropylene or butylene radical. However, alkylene radicals are to be understood here as meaning also unsaturated aliphatic radicals such, for example, as the vinylene radical (—CH=CH—) or the propylene radical (—CH=CH—CH$_2$—). Suitable alkylene radicals are preferably lower molecular radicals, that is to say radicals which contain approximately 1 to 4 carbon atoms, in particular the methylene radical (—CH$_2$—) and the ethylene radical (—CH$_2$—CH$_2$—). The group —OR$_2$—X is preferably in the para-position to the azo bridge. As the functional radical X, the hydroxy group is to be particularly singled out for mention. Where X is an alkoxy group, this latter may also occur as an epoxy group, for example as a closed three-membered ring or in long-chain polymerised form. X may also be lower alkanoyloxy, lower alkanoyl, lower alkoxycarbonyl, 1,2-epoxyethyl or 2,3-epoxypropyl. The disazo compounds of the invention can be manufactured in known manner by diazotising a 1-aminobenzene-2,-3 or -4-sulphonic acid and coupling with an aminobenzene in the para-position such, for example, as 1-amino-2,5-dimethyl- or 2,5-dimethoxybenzene, 1-amino-2-methyl- or -2-methoxybenzene or with an aminobenzene-N-methanesulphonic acid. In this latter case, the methanesulphonic acid is split off after the coupling by treating it with an alkali, the resulting aminomonoazo compound is subsequently diazotised and coupled with a coupling phenol in the ortho- or para-position and the phenolic HO group is etherified, for example with substituted alkylhalides, such as epichlorohydrin or chloroacetonitrile.

As examples of starting substances of the 1-aminobenzene-2-, -3- or -4-sulphonic acid series there may be cited:

1-amino-6-methoxybenzene-3- or -4-sulphonic acid
1-amino-6-methylbenzene-3- or -4-sulphonic acid
1-amino-6-chlorobenzene-4-sulphonic acid
1-aminobenzene-3- or -4-sulphonic acid
1-aminobenzene-2-sulphonic acid
1-amino-6-ethoxybenzene-3- or -4-sulphonic acid
1-amino-3,6-dichlorobenzene-4-sulphonic acid
1-amino-4-methylbenzene-2-sulphonic acid
1-amino-4-chlorobenzene-2-sulphonic acid and also
1-aminobenzene-2,5- or -2,4-disulphonic acid.

Suitable aminonaphthalenesulphonic acids are preferably di- and monosulphonic acids, such as 2-aminonaphthalene-4,8-disulphonic acid, 1-aminonaphthalene-3,6-disulphonic acid and in particular, the α- and β-naphthyl-aminomonosulphonic acids.

As coupling components for the first coupling there may be mentioned: aniline,
1-amino-2,5-dimethoxybenzene
1-amino-2-methoxy-5-methoxybenzene
1-amino-2-methoxybenzene
1-amino-2,5-diethoxybenzene
1-amino-2-methylbenzene
1-amino-2-ethoxybenzene
1-amino-2,5-dimethylbenzene
1-amino-2-propoxybenzene
1-amino-2,5-diethylbenzene.

Suitable phenolic coupling components are:
phenol,
resorcinol,
1-hydroxy-2- or -3-methoxybenzene
1-hydroxy-2- or -4-methoxybenzene
1-hydroxy-3- or -4-butoxybenzene
1-hydroxy-2-(1-methyl)ethyl-5-methylbenzene
1-hydroxy-2-(1-methyl)-propylbenzene
1-hydroxy-3,4-dimethoxybenzene
1-hydroxy-3-ethoxybenzene
1-hydroxy-4-(1-methyl)-propylbenzene
1-hydroxy-4-ethylbenzene
1-hydroxy-4-tert.-butylbenzene.

As etherifying agents, particular mention may be made of the alkyl halides containing a lower molecular substituted alkyl group;
ethylene chlorohydrin
1-chloro-2,3-epoxy-propane
ethylene bromohydrin
chloroacetonitrile
chloropropionitrile
bromoacetonitrile
chloroacetone
bromoacetone
1,2-dichloroethane
1,2-dichloroethylene
1,3-dichloropropane
propylene chlorohydrin
chlorodimethyl ether
β-chlorodiethyl ether
chloromethyl-phenyl ether chloroacetophenone
β-chloropropionic acid
ethyl bromoacetate
ethyl chloroacetate
glycerine-1- or -2-chlorohydrin.

The compounds according to the invention are new. They can be used for dyeing materials of the most diverse kinds, but are particularly suitable for dyeing superpolyurethane and superpolyamide fibres, in particular nylon fibres. The dyeing is carried out by the usual methods, for example in aqueous, weakly acid to weakly alkaline bath.

The dyestuffs possess a very good build-up capacity. The dyeings obtained are distinguished by excellent fastness properties, and in particular by excellent fastness to washing and light.

The new dyestuffs can be used likewise for dyeing and printing textile materials of animal origin, such as leather, silk and especially wool.

The obtained dyeings are remarkable for the purity of their hues, the brilliance and strength of their shades, good fastness to alkali, light and wet processing, their levelness and migration properties, and also their good cover of streakiness.

Dyeing can also be carried out with the conjoint use of conventional assistants; and the dyed materials can be subjected to known forms of aftertreatment.

The following Examples illustrate the invention. Unless otherwise stated, the parts and percentages are by weight to parts by volume is the same as that of the gram to the litre.

EXAMPLE 1

44.2 Parts of the dry disazo dyestuff of the formula

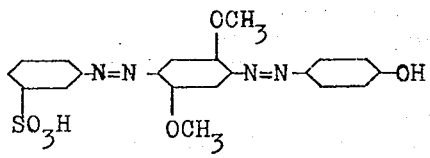

are stirred in 1500 parts of n-butyl alcohol. To the suspension are added 106 parts of finely powered calcinated sodium carbonate and 48.0 parts of ethylene chlorohydrin. The reaction mixture is heated for 30 hours to 100°–110°C while stirring thoroughly.

The mixture is then diluted with 1500 parts of water and the n-butyl alcohol is expelled with steam. The dyestuff is precipitated by adding 10 vol. % of sodium chloride and filtered.

Amounts of unreacted dyestuff are thoroughly rinsed with sodium chloride solution which contains sodium carbonate.

In the dried state, the pure dyestuff is an orange brown powder which, in a neutral to weakly acid bath, dyes polyamide fibres in pure orange shades which are outstandingly fast to light.

EXAMPLE 2

39.5 Parts of the disazo dyestuff of the formula

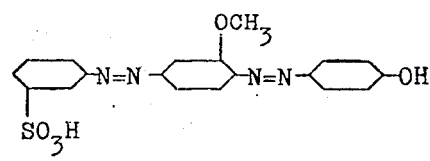

are stirred in 500 parts of ethyl alcohol and 200 parts of water. The homogeneous mixture is treated with 11 parts of sodium hydroxide solution (30%), 34 parts of calcinated sodium carbonate and 35 parts of ethylene chlorohydrin, and heated in an autoclave for 20 hours to 108°–112°C.

The resulting reaction mixture is cooled, filtered and rinsed with sodium chloride solution which contains sodium carbonate.

In the dried state, the dyestuff is a yellow brown powder which, from a neutral to weakly acid bath, dyes polyamide fibres in reddish yellow shades which are very fast to light.

EXAMPLE 3

41.0 Parts of the dry disazo dyestuff of the formula

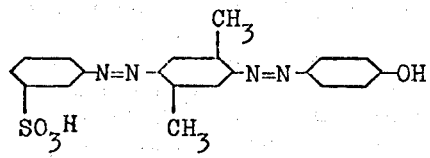

are thoroughly stirred in 1500 parts of n-butyl alcohol. To the suspension are added 106 parts of finely powdered calcinated sodium carbonate and 55 parts of 1-chloro-2,3-epoxypropane. The reaction mixture is heated to 100°–110°C for 10 hours while stirring thoroughly. It is then diluted with water, and the butyl alcohol is expelled with steam.

The dyestuff is completely precipitated by adding sodium chloride, filtered and rinsed with sodium chloride solution which contains sodium carbonate.

In the dried state, the dyestuff is a yellow brown powder which, in a neutral to weakly acid bath, dyes polyamide fibres in yellowish orange shades which are very fast to light.

The following table lists the formulae of further disazo dyestuffs, which can be obtained according to the processes of Examples 1 to 3 and dye polyamide fibres in orange to red shades.

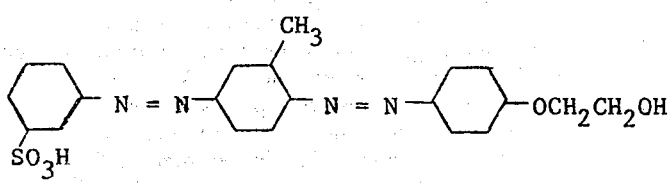

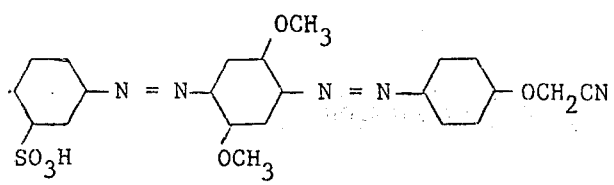
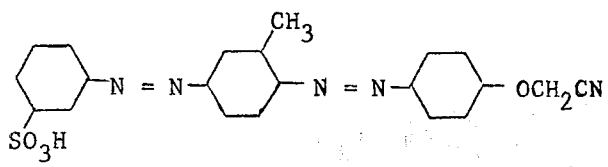
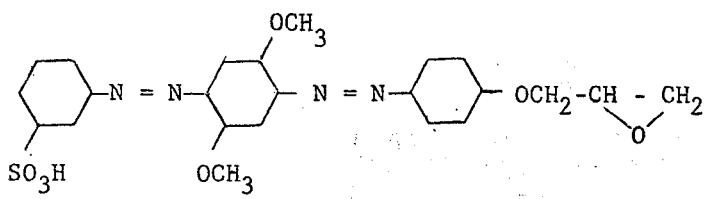
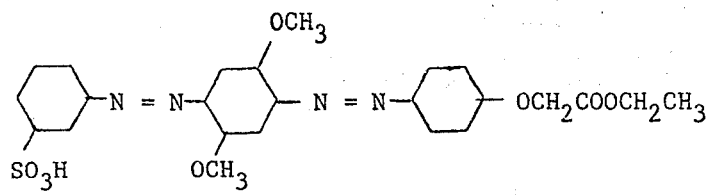
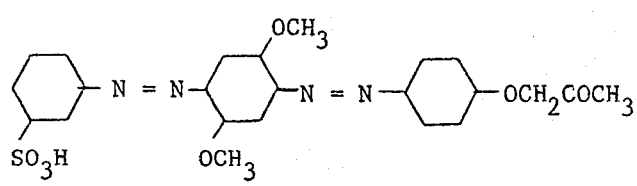
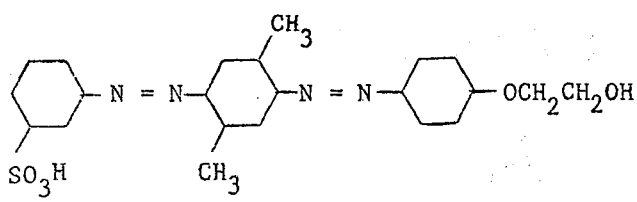
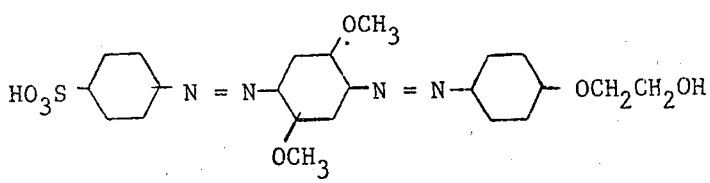
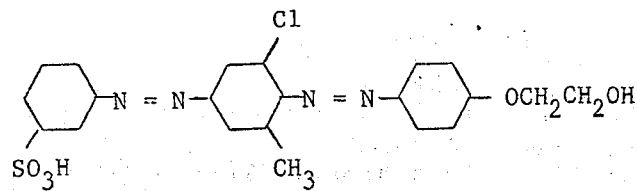

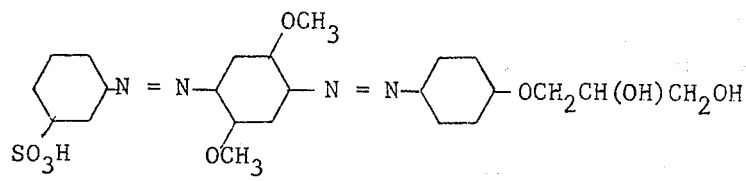

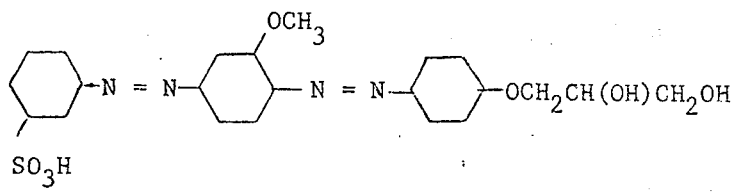

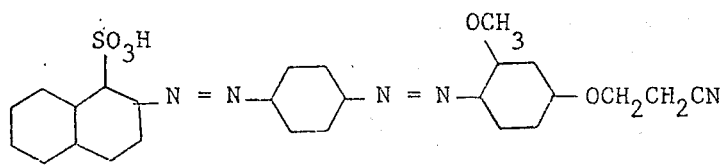

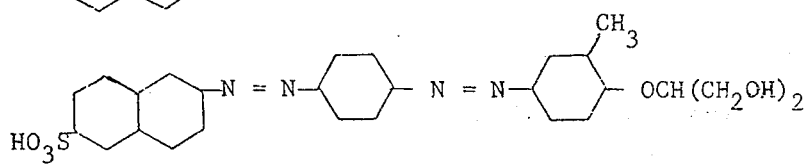

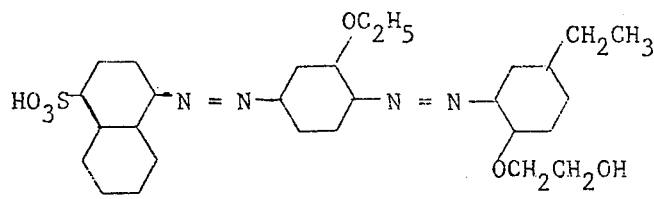

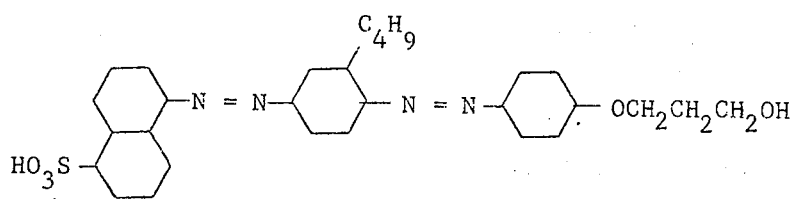

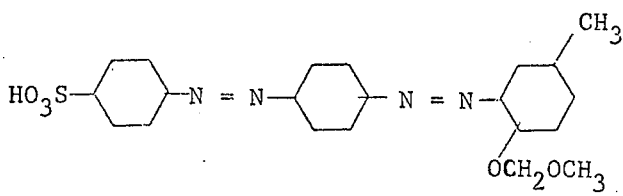

Instead of a homogeneous etherifying agent, it is also possible to use mixtures of various etherifying agents. Likewise, it is possible to etherify stepwise and in succession with various etherifying agents in order to thereby obtain dyestuff mixtures possessing particular properties, for example in regard to solubility or shade. Thus, for example, the phenolic starting product can be reacted partially with ethylene chloride and subsequently the remainder of the starting product with glycerine-1-chlorohydrin. In this way, dyestuff mixtures are obtained which dye polyamide fibres in orange to red shades which are fast to light.

Dyeing Instruction

A polyamide fabric is introduced at 40°C into a bath which contains 2% of acetic acid (80%) and 2% of a levelling agent. The bath is left to stand for 10 minutes and then an aqueous solution of the dyestuff of Example 1 is added. The bath is brought to boiling temperature in the course of 30–45 minutes, and the material is dyed subsequently for a further 60–90 minutes at the boil. After the material has been washed and rinsed, a pure orange dyeing is obtained.

I claim:
1. A disazo compound of the formula

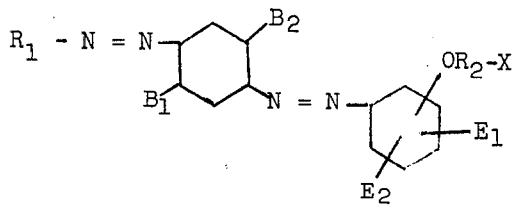

in which $R_1$ is mono- or disulfonated phenyl or naphthyl which, in addition to said sulfo groups is further unsubstituted or substituted by chlorine, lower alkyl or lower alkoxy, $B_1$, $B_2$, $E_1$ and $E_2$ each is hydrogen, lower alkyl or lower alkoxy, $R_2$ is low molecular alkylene, vinylene or propylene, X is chloro hydroxyl cyano, lower alkoxy, phenoxy, carboxyl, lower alkanoyl, lower alkoxycarbonyl, benzoyl benzoyl, or 1,2 epoxyethyl or 2,3-epoxypropyl, and $-OR_2-X$ is in the ortho- or para-position to the azo bridge.

2. A disazo compound according to claim 1, in which X has the formula $-CO-R_3$, wherein $R_3$ represents hydroxy, low molecular alkyl low molecular alkoxy or phenyl.

3. A disazo compound according to claim 1, in which X has the formula $-O-R_4$, wherein $R_4$ represents hydrogen, low molecular alkyl or phenyl.

4. A disazo compound according to claim 1 in which $R_1$ corresponds to the formula

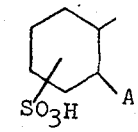

wherein A represents hydrogen low molecular alkyl or low molecular alkoxy.

5. A disazo compound according to claim 4, which contains 2 to 4 low molecular alkyl or low molecular alkoxy groups.

6. A disazo compound according to claim 5, in which $B_1$ and $B_2$ each represent methoxy or ethoxy.

7. A disazo compound according to claim 6, in which $E_1$ and $E_2$ are hydrogen.

8. A disazo compound according to claim 5 in which $R_2$ represents methylene or ethylene.

9. A disazo compound according to claim 8, in which X is hydroxy.

10. The disazo compound according to claim 9 of the formula

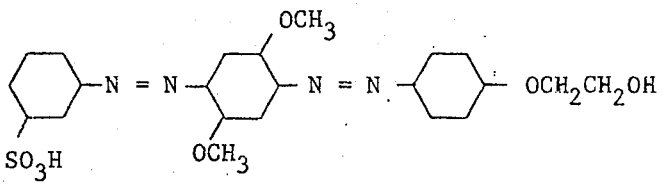

* * * * *